US012719045B2

(12) United States Patent
Chen et al.

(10) Patent No.: US 12,719,045 B2
(45) Date of Patent: Aug. 25, 2026

(54) NEGATIVE ELECTRODE COMPOSITE MATERIAL AND APPLICATION THEREOF

(71) Applicant: NINGDE AMPEREX TECHNOLOGY LIMITED, Ningde (CN)

(72) Inventors: Zhihuan Chen, Ningde (CN); Ting Yi, Ningde (CN); Daoyi Jiang, Ningde (CN); Hang Cui, Ningde (CN)

(73) Assignee: Ningde Amperex Technology Limited, Ningde City (CN)

(*) Notice: Subject to any disclaimer, the term of this patent is extended or adjusted under 35 U.S.C. 154(b) by 1119 days.

(21) Appl. No.: 17/690,272

(22) Filed: Mar. 9, 2022

(65) Prior Publication Data

US 2022/0199975 A1 Jun. 23, 2022

Related U.S. Application Data

(63) Continuation of application No. PCT/CN2020/087180, filed on Apr. 27, 2020.

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/366* (2013.01); *H01M 4/386* (2013.01); *H01M 4/587* (2013.01);
(Continued)

(58) Field of Classification Search
CPC ........... H01M 10/0525; H01M 2004/021–027; H01M 4/364; H01M 4/366; H01M 4/386; H01M 4/587; H01M 4/625
See application file for complete search history.

(56) References Cited

U.S. PATENT DOCUMENTS

2016/0056451 A1* 2/2016 Singh et al. .......... H01M 4/133
2018/0212239 A1* 7/2018 Jacob .................... H01M 4/366

FOREIGN PATENT DOCUMENTS

CN 1758466 A 4/2006
CN 102299338 A 12/2011
(Continued)

OTHER PUBLICATIONS

Chen, CN106058201A EPO machine translation, 2016 (Year: 2016).*
(Continued)

*Primary Examiner* — Jonathan G Leong
*Assistant Examiner* — Kan Luo
(74) *Attorney, Agent, or Firm* — Maier & Maier, PLLC

(57) ABSTRACT

A negative electrode composite material includes a Si-M-C composite material. A conductive layer exists on a surface of the Si-M-C composite material, M includes at least one of boron, nitrogen, or oxygen. Chemical shifts of a silicon element in the Si-M-C composite material as measured in a solid-state nuclear magnetic resonance test include −5 ppm±5 ppm, −35 ppm±5 ppm, −75 ppm±5 ppm, −110 ppm±5 ppm. A peak width at half height at −5 ppm±5 ppm is K, and K satisfies: 7 ppm<K<28 ppm. The negative electrode composite material exhibits a relatively low expansion rate and a relatively high conductivity. A negative electrode plate and an electrochemical device made of the negative electrode composite material exhibit high cycle performance.

15 Claims, 1 Drawing Sheet

(51) Int. Cl.
*H01M 4/38* (2006.01)
*H01M 4/587* (2010.01)
*H01M 4/62* (2006.01)
*H01M 10/0525* (2010.01)

(52) U.S. Cl.
CPC ....... *H01M 4/625* (2013.01); *H01M 10/0525* (2013.01); *H01M 2004/021* (2013.01); *H01M 2004/027* (2013.01)

(56) References Cited

FOREIGN PATENT DOCUMENTS

| | | | | | |
|---|---|---|---|---|---|
| CN | 103337610 | A | * 10/2013 | ............. | H01M 4/36 |
| CN | 104412423 | A | 3/2015 | | |
| CN | 104659341 | A | 5/2015 | | |
| CN | 106058201 | A | * 10/2016 | ............. | H01M 4/36 |
| CN | 107431196 | A | 12/2017 | | |
| CN | 108292747 | A | 7/2018 | | |
| CN | 109301184 | A | 2/2019 | | |
| CN | 110635119 | A | 12/2019 | | |
| CN | 110797520 | A | 2/2020 | | |
| JP | 2016-139579 | A | 8/2016 | | |
| JP | 201797955 | A | 6/2017 | | |
| KR | 1020130134241 | A | 12/2013 | | |
| WO | 2020016280 | A1 | 1/2020 | | |

OTHER PUBLICATIONS

Jiang, CN109301184A EPO machine translation, 2019 (Year: 2019).*
Pradeep, Study of silicon oxycarbide (SiOC) as anode material for Li-ion batteries, Doctoral Thesis, University of Trento (Italy) (Year: 2013).*
Zang, CN-103337610-A machine translation, 2013 (Year: 2013).*
Mera et al., Polymer-derived SiCN and SiOC ceramics—structure and energetics at the nanoscale, 2013, J. Mater. Chem. A, 2013, 1, 3826 (Year: 2013).*
International Search Report mailed Jan. 25, 2021, corresponding to International Application No. PCT/CN2020/087180 with English translation; 7 pages.
First Office Action issued Jan. 26, 2022, corresponding to Chinese Application No. 202080006823.9; 7 pages.
Monika Wilamowska-Zawlocka et al., "Silicon oxycarbide ceramics as anodes for lithium ion batteries: influence of carbon content on lithium storage capacity"; Royal Society of Chemistry Advances; vol. 6; No. 106; Oct. 27, 2016; ISSN: 2046-2069; pp. 104597-104607.
Hiroshi Fukui et al., "Lithium Species in Electrochemically Lithiated and Delithiated Silicon Oxycarbides"; ACS Applied Materials & Interfaces, vol. 6; No. 15; Jul. 25, 214; ISSN: 1944-8244; pp. 12827-12836.
Office Action issued on Aug. 16, 2022, in corresponding Japanese Application No. 2021-532460, 4 pages.
Office Action issued on Jul. 31, 2023, in corresponding Chinese Application No. 202080006823.9, 12 pages.
Office Action issued on Oct. 18, 2024, in corresponding Korean Application No. 10-2022-7036213, 11 pages.
Notice of Allowance issued on Apr. 9, 2025, in corresponding Korean Application No. 10-2022-7036213, 3 pages.
Kaspar et al., "SiOC(N)/Hard Carbon Composite Anodes for Na-Ion Batteries: Influence of Morphology on the Electrochemical Properties", Journal of the Electrochemical Society, The Electrochemical Society, Nov. 10, 2015, vol. 163, No. 2, 8 pages.

* cited by examiner

NEGATIVE ELECTRODE COMPOSITE MATERIAL AND APPLICATION THEREOF

CROSS-REFERENCE TO RELATED APPLICATIONS

This application is a national phase application of PCT application PCT/CN2020/087180, filed on Apr. 27, 2020, the disclosure of which is hereby incorporated by reference in its entirety.

TECHNICAL FIELD

This application relates to the technical field of lithium-ion batteries, and in particular, to a negative electrode composite material and application thereof.

BACKGROUND

Lithium-ion batteries are widely used in the field of consumer electronics by virtue of characteristics such as a high specific energy, a high working voltage, a low self-discharge rate, a small size, and a light weight. With rapid development of electric vehicles and portable electronic devices, people pose higher requirements on energy density, safety, cycle performance, and the like of the lithium-ion batteries. In a lithium-ion battery, a silicon material possesses a high theoretical specific capacity (4200 mAh/g), and embraces a broad prospect for use in the lithium-ion battery. However, a silicon-based negative electrode material faces the following problems: silicon is poorly conductive, and a conductivity of silicon is typically less than 0.01 S/cm; with the intercalation and deintercalation of lithium ions, the volume of the silicon-based material changes by 120% to 300%, thereby pulverizing the silicon-based material and detaching the silicon-based material from a current collector. Such problems reduce cycle performance of the lithium-ion battery and hinder broader application of the silicon-based negative electrode material.

Main methods for overcoming the significant volume change and the poor conductivity of the silicon material during cycling include: designing a porous silicon-based material, downsizing the silicon-based material, coating the surface of the silicon-based material with carbon, and the like. The approach of designing a porous silicon-based material and the approach of downsizing the silicon-based material suppress the expansion problem to some extent. However, with ongoing cycles, occurrence of side reactions, and uncontrollable growth of an SEI (Solid electrolyte interphase, solid electrolyte interphase) film, the cycle stability of the silicon-based negative electrode material is further bottlenecked. The carbon coating can provide an excellent conductivity additionally. During a plurality of cycles, a carbon layer is prone to peel off from a substrate due to expansion, shrinkage, and rupture of silicon. With the formation of the SEI film and the wrapping of by-products, electrochemical impedance and polarization increase, thereby affecting the cycle life of the lithium-ion battery.

Therefore, there is an urgent need to develop a silicon-based negative electrode material that can further improve the cycle stability of the lithium-ion battery and suppress the volume expansion of the lithium-ion battery.

SUMMARY

An objective of this application is to provide a silicon-based negative electrode composite material to at least improve cycle stability of a lithium-ion battery and suppress volume expansion of the lithium-ion battery.

A first aspect of this application provides a negative electrode composite material, including a Si-M-C composite material. A conductive layer exists on a surface of the Si-M-C composite material, M includes at least one of boron, nitrogen, or oxygen. Chemical shifts of a silicon element in the Si-M-C composite material as measured in a solid-state nuclear magnetic resonance test include −5 ppm±5 ppm, −35 ppm±5 ppm, −75 ppm±5 ppm, −110 ppm±5 ppm. A peak width at half height at −5 ppm±5 ppm is K, and K satisfies: 7 ppm<K<28 ppm.

In some embodiments of the first aspect of this application, $D_{v50}$ of the Si-M-C composite material is 2.0 μm to 8.0 μm; and $D_{v50}$ of the negative electrode composite material is 3.0 μm to 12.0 μm.

In some embodiments of the first aspect of this application, a thickness of the conductive layer is 1 nm to 100 nm.

In some embodiments of the first aspect of this application, the conductive layer includes a polymer and a conductive carbon material.

In some embodiments of the first aspect of this application, a weight of the polymer is 0.05% to 10% of a total weight of the negative electrode composite material.

In some embodiments of the first aspect of this application, a mass ratio between the conductive carbon material and the polymer is 1:0.2 to 1:10.

In some embodiments of the first aspect of this application, the conductive carbon material includes at least one of single-walled carbon nanotubes, multi-walled carbon nanotubes, carbon nanoparticles, carbon fiber, or graphene.

In some embodiments of the first aspect of this application, the polymer includes at least one of polyvinylidene difluoride, carboxymethyl cellulose, sodium carboxymethyl cellulose, polyvinylpyrrolidone, polyacrylic acid, polystyrene butadiene rubber, polyacrylamide, polyimide, polyamide imide, or a derivative thereof.

A second aspect of this application provides a negative electrode plate, including a hybrid layer. The hybrid layer includes the negative electrode composite material according to the first aspect of this application.

A third aspect of this application provides an electrochemical device, including the negative electrode plate according to the second aspect of this application.

A fourth aspect of this application provides an electronic device, including the electrochemical device according to the third aspect of this application.

With the negative electrode composite material according to this application, the expansion rate of the Si-M-C composite material is lower than that of a conventional silicon-based composite material, and a conductive layer exists on the surface of the Si-M-C composite material, thereby improving the conductivity of the negative electrode composite material.

In addition, the negative electrode plate and the electrochemical device according to this application exhibits excellent cycle performance.

The term "$D_{v50}$" herein means a particle diameter of particles at a cumulative volume of 50% in a volume-based particle size distribution, and is a particle diameter than which the volume of the particles smaller accounts for 50% of the total volume of all the particles. The particle diameter is measured with a laser particle size analyzer.

BRIEF DESCRIPTION OF DRAWINGS

To describe the technical solutions in the embodiments of this application or the prior art more clearly, the following outlines the drawings to be used in the embodiments of this application or the prior art. Evidently, the drawings outlined below merely illustrate some embodiments of this application, and a person of ordinary skill in the art may derive other drawings from such drawings without making any creative effort.

DETAILED DESCRIPTION

Figure 1:
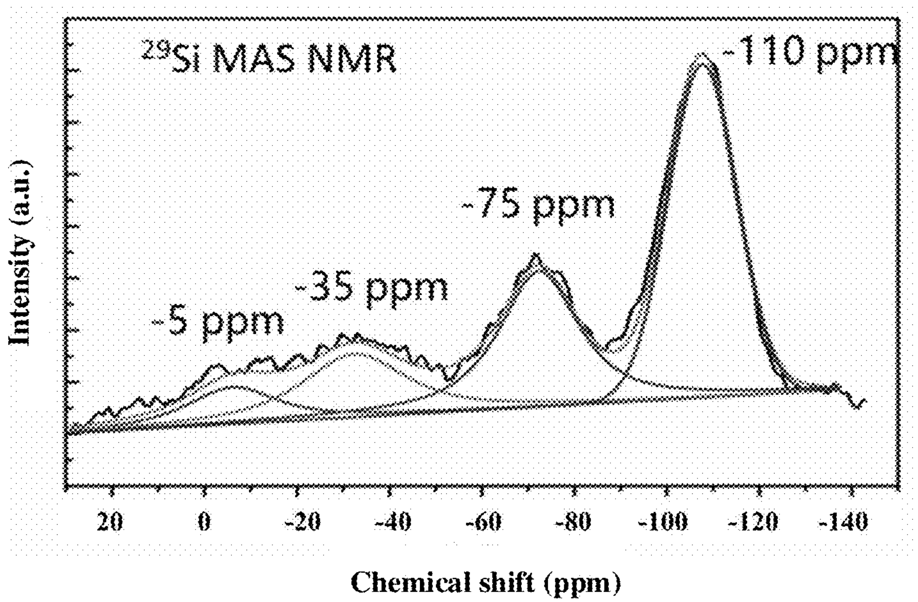
FIG. 1 shows a solid-state nuclear magnetic resonance spectrum of a Si-M-C composite material according to Embodiment 1.

To make the objectives, technical solutions, and advantages of this application clearer, the following describes this application in more detail with reference to drawings and embodiments. It is apparent that the described embodiments are merely a part of but not all of the embodiments of this application. All other embodiments derived by a person of ordinary skill in the art based on the embodiments of this application without making any creative efforts shall fall within the protection scope of this application.

A first aspect of this application provides a negative electrode composite material, including a Si-M-C composite material. A conductive layer exists on a surface of the Si-M-C composite material, M includes at least one of boron, nitrogen, or oxygen. Chemical shifts of a silicon element in the Si-M-C composite material as measured in a solid-state nuclear magnetic resonance test include −5 ppm±5 ppm, −35 ppm±5 ppm, −75 ppm±5 ppm, −110 ppm±5 ppm. A peak width at half height at −5 ppm±5 ppm is K, and K satisfies: 7 ppm<K<28 ppm.

As unexpectedly discovered in the research of this application, in contrast with some carbon-silicon-oxygen composite materials and the like in the prior art, the chemical shifts of the silicon element in the Si-M-C composite material according to this application as measured through solid-state nuclear magnetic resonance include −5 ppm±5 ppm. More unexpectedly, it is found that the Si-M-C composite material according to this application exhibits a lower expansion rate when the peak width at half height (K) at −5 ppm±5 ppm satisfies: 7 ppm<K<28 ppm.

"A conductive layer exists on a surface of the Si-M-C composite material" mentioned in this application may be understood as: a conductive layer exists on at least a part of the surface of the Si-M-C composite material, or a conductive layer may exist on the entire surface. This is not particularly limited in this application. The conductive layer can increase the conductivity of the negative electrode composite material and improve electrical performance of the material.

In some embodiments of the first aspect of this application, $D_{v50}$ of the Si-M-C composite material is 2.0 μm to 8.0 μm; and $D_{v50}$ of the negative electrode composite material is 3.0 μm to 12.0 μm.

As discovered in the research of this application, when particle diameters of the Si-M-C composite material are close, if the particle diameter of the negative electrode composite material is smaller, the particle size distribution is more homogeneous in the hybrid layer of the electrode plate, polarization is reduced, cycle performance and rate performance of a cell are enhanced, and cell expansion is suppressed.

The thickness of the conductive layer is not particularly limited in this application as long as the thickness can achieve the objectives of this application. In some embodiments of the first aspect of this application, the thickness of the conductive layer may be 1 nm to 100 nm.

In some embodiments of the first aspect of this application, the conductive layer includes a polymer and a conductive carbon material.

In some embodiments of the first aspect of this application, the conductive carbon material includes at least one of single-walled carbon nanotubes, multi-walled carbon nanotubes, carbon nanoparticles, carbon fiber, or graphene. Preferably, the conductive carbon material includes single-walled carbon nanotubes and/or multi-walled carbon nanotubes. The parameters of the carbon nanotubes are not limited in this application, and may be selected by a person skilled in the art as required. For example, the diameter of the carbon nanotubes may be 2 nm to 30 nm, and a length-to-diameter ratio of the carbon nanotubes is 50 to 30000.

In some embodiments of the first aspect of this application, the polymer includes at least one of polyvinylidene difluoride, carboxymethyl cellulose, sodium carboxymethyl cellulose, polyvinylpyrrolidone, polyacrylic acid, polystyrene butadiene rubber, polyacrylamide, polyimide, polyamide imide, or a derivative thereof.

It is found that an increase in the content of the conductive layer can increase the conductivity of the powder, improve the exertion of the specific capacity, and enhance the cycle performance of a full battery. However, as the weight of the conductive layer increases, the rate performance of the full battery gradually declines. In some embodiments of the first aspect of this application, the weight of the conductive layer is 0.05% to 10% of the total weight of the negative electrode composite material.

It is also found in the research of this application, without being limited to any theory, the existence of a specific amount of polymer helps to disperse the conductive carbon material, thereby reducing the particle diameter of the negative electrode composite material, improving the conductivity of the negative electrode composite material, and improving the cycle performance of the full battery. In some embodiments of the first aspect of this application, a mass ratio between the conductive carbon material and the polymer is 1:0.2 to 1:10.

The negative electrode composite material according to this application may be prepared by performing the following steps:

1) Dissolving a carbon source in an organic solvent, adding organosilicon into the organic solvent after the carbon source is completely dissolved, stirring for 3 to 5 hours to thoroughly mix the carbon source solution and the organosilicon, then heating and stirring the solution to remove the solvent, and performing drying. In this process, the mass ratio between the carbon source and the organosilicon is 1:1 to 1:3, and preferably 1:2; and a mass-to-volume ratio, that is, a ratio of the mass of the carbon source to the volume of the organic solvent, is 1:10 g/ml to 1:100 g/ml.
2) Pyrolyzing the product obtained in step 1) at a high temperature of 900° C. to 1500° C. under the protection of an inert gas to obtain a Si-M-C composite material;
3) Adding the Si-M-C composite material, the conductive carbon material, the polymer, and the solvent at a specific mixing ratio into a vacuum mixer, and stirring for 150 to 200 minutes to obtain a mixed slurry; and
4) Spray-drying and granulating the mixed slurry.

In step 1), the carbon source may include at least one of glucose or sucrose. The organic solvent may be selected from organic solvents commonly used in the art, and is not limited in this application. For example, the organic solvent may be one or more of xylene, ethanol, or acetone. The organosilicon includes at least one of polysiloxane, polysilazane, polycarborane methyl siloxane, or polysilborazane.

The heating and stirring in step 1) are common technical means in the art, and aim to remove the organic solvent therein. For example, without being limited herein, the mixture may be stirred at 60° C. to 100° C.

The drying in step 1) is a common technical means in the art. For example, without being limited herein, the drying may be performed in a drying oven at 60° C. to 100° C. for 20 to 30 hours.

The inert gas in step 2) includes nitrogen or argon, which are protective gases commonly used in the art. The protective gasses are not limited in this application.

In step 2), the product is pyrolyzed at a high temperature of 900° C. to 1500° C. Specifically, reaction conditions may be: increasing the temperature to 500° C. at a speed of 1° C./min, holding on for 30 minutes, and then increasing the temperature to 900° C. to 1500° C. at a speed of 3° C./min, and holding on for 3 hours.

In step 3), the solvent may include at least one of water, ethanol, methanol, n-hexane, N,N-dimethylformamide, pyrrolidone, acetone, toluene, or isopropanol.

In step 3), the mass ratio between the conductive carbon material and the polymer is 1:0.2 to 1:10. The mass of the conductive carbon material and the polymer is 0.05% to 10% of the total mass of the Si-M-C composite material, the conductive carbon material, and the polymer. The mass-to-volume ratio, that is, a ratio of the mass of the Si-M-C composite material to the volume of the solvent, is 1:0.5 g/ml to 1:10 g/ml.

As unexpectedly discovered in the research of this application, when the reaction temperature of pyrolysis is 900° C. to 1500° C., the peak width at half height at the chemical shift of −5 ppm±5 ppm of the silicon element is K, and K satisfies: 7 ppm<K<28 ppm. When the reaction temperature is 900° C. to 1500° C., the particle diameter of the obtained Si-M-C composite material ranges approximately from 2.0 μm to 8.0 μm.

A second aspect of this application provides a negative electrode plate, including a hybrid layer. The hybrid layer includes the negative electrode composite material according to the first aspect of this application.

In some embodiments of the second aspect of this application, the negative electrode plate may further include a current collector. The hybrid layer may be coated on one or two surfaces of the current collector. Depending on actual needs, a person skilled in the art may determine whether one or two surfaces are coated with the hybrid layer, without being limited in this application.

The current collector is not particularly limited, and may be any current collector known to a person skilled in the art. Specifically, for example, the current collector may be formed from at least one of iron, copper, aluminum, nickel, stainless steel, titanium, tantalum, gold, platinum, or the like. Preferably, a negative current collector is a copper foil or a copper alloy foil. One of the foregoing materials may be used alone, or two or more of the foregoing materials may be used together at any ratio.

In some embodiments of this application, the hybrid layer further includes graphite. The graphite includes artificial graphite and/or natural graphite. Specifically, the hybrid layer may be any one of mesocarbon microbead, soft carbon, or hard carbon, or any combination thereof. In some embodiments of this application, a mixture of the negative electrode composite material according to this application and graphite may be used as a negative active material. The mass of the negative electrode composite material according to this application is 50% to 100% of the total mass of the negative active material.

In some embodiments of this application, the hybrid layer may further include a binder. The binder is not particularly limited, and may be any binder or any combination of binders known in the art. For example, the binder may be at least one of polyacrylate, polyimide, polyamide, polyamide imide, polyvinylidene difluoride, styrene butadiene rubber, sodium alginate, polyvinyl alcohol, polytetrafluoroethylene, polyacrylonitrile, sodium carboxymethyl cellulose, potassium carboxymethyl cellulose, sodium hydroxypropyl cellulose, potassium hydroxypropyl cellulose, or the like. One of the binders may be used alone, or two or more of the binders may be used together at any ratio.

In some embodiments of this application, the hybrid layer may further include a conductive agent. The conductive agent is not particularly limited, and may be any conductive agents known to a person skilled in the art or a combination thereof. For example, the conductive agent may be at least one of a zero-dimensional conductive agent, a one-dimensional conductive agent, or a two-dimensional conductive agent. Preferably, the conductive agent may include at least one of carbon black, conductive graphite, carbon fiber, carbon nanotube, VGCF (vapor grown carbon fiber), or graphene. The dosage of the conductive agent is not particularly limited, and may be determined based on common knowledge in the art. One of the foregoing conductive agents may be used alone, or two or more of the conductive agents may be used together at any ratio.

In some embodiments of the second aspect of this application, the thickness of the negative electrode plate may be 50 μm to 200 μm, the compacted density on a single side may be 1.2 g/cm$^3$ to 2.0 g/cm$^3$, and the peel-off strength between the hybrid layer and the current collector is greater than 10 N/m.

A third aspect of this application provides an electrochemical device, including the negative electrode plate according to the second aspect of this application.

The electrochemical device according to this application includes but is not limited to: any type of primary battery, secondary battery, fuel battery, solar battery, or capacitor. A typical electrochemical device is a lithium-ion battery. The lithium-ion battery is a secondary battery. The electrochemical device, such as a lithium-ion battery, generally includes a negative electrode plate, a positive electrode plate, a separator, and an electrolytic solution.

Further, the electrochemical device may be a lithium-ion battery according to this application.

In the electrochemical device according to this application, the negative electrode plate is the negative electrode plate according to this application; and other components such as a positive electrode plate, a separator, an electrolytic solution are not particularly limited. Exemplarily, the positive electrode material in the positive electrode plate may include, but is not limited to, lithium cobaltate, lithium manganate, lithium iron phosphate, and the like. The material of the separator may include, but is not limited to, glass fiber, polyester, polyethylene, polypropylene, polytetrafluoroethylene, or any combination thereof. The electrolytic solution generally includes an organic solvent, a lithium salt, and an additive. The organic solvent may include, but is not limited to, at least one of ethylene carbonate (EC), propylene carbonate (PC), diethyl carbonate (DEC), ethyl methyl carbonate (EMC), dimethyl carbonate (DMC), propylene carbonate, or ethyl propionate. The lithium salt may include, but is not limited to, at least one of an organic lithium salt or an inorganic lithium salt. For example, the lithium salt may include at least one of lithium hexafluorophosphate ($LiPF_6$), lithium tetrafluoroborate ($LiBF_4$), lithium difluorophosphate ($LiPO_2F_2$), lithium bistrifluoromethanesulfonimide $LiN(CF_3SO_2)_2$ (LiTFSI), lithium bis(fluorosulfonyl)imide $Li(N(SO_2F)_2)$ (LiFSI), lithium bis(oxalate) borate $LiB(C_2O_4)_2$ (LiBOB), or lithium difluoro(oxalate)borate $LiBF_2(C_2O_4)$ (LiDFOB).

The preparation process of the electrochemical device is well known to a person skilled in the art, and is not particularly limited in this application. For example, a secondary battery may be manufactured in the following process: stacking a positive electrode and a negative electrode that are interspaced with a separator, performing operations such as winding and folding as required, placing them into a battery container, injecting an electrolytic solution into the battery container, and sealing the container, where the negative electrode is the negative electrode plate according to this application. In addition, an anti-overcurrent element, a guide plate, and the like may be placed into the battery container as required, so as to prevent pressure rise inside the battery, overcharge, and overdischarge.

A fourth aspect of this application provides an electronic device, including the electrochemical device according to the third aspect of this application.

The following describes this application in more detail with reference to embodiments. However, this application is not limited to such embodiments.

Solid-State Nuclear Magnetic Resonance Test

A $^{29}Si$ solid-state nuclear magnetic resonance spectrum test is performed on an AVANCE III 400 WB wide-cavity solid-state nuclear magnetic resonance instrument. A rotation rate of 8 kHz corresponds to $^{29}Si$. FIG. 1 shows a solid-state nuclear magnetic resonance spectrum of a Si-M-C composite material according to Embodiment 1.

Particle Size Test

Adding approximately 0.02 gram of each powder sample into a 50 ml-sized clean beaker, adding approximately 20 ml of deionized water, and then adding a few drops of 1% surfactant to fully disperse the powder in the water; performing ultrasonic cleaning in a 120 W ultrasonic cleaning machine for 5 minutes, and measuring the particle size distribution by using MasterSizer 2000.

Testing Conductivity of Composite Material Powder

Take 5 grams of negative electrode composite powder as a sample, applying a pressure with an electronic press until a constant pressure of 5000 kg±2 kg, holding on for 15 s to 25 s, placing the sample between electrodes of a resistivity tester (ST-2255A by Suzhou Jingge Electronic Co., Ltd.). The height of the sample is h (cm), the voltage across two ends is U, the current is I, the resistance is R (a), and the area of the powder pressed into sheets is S=3.14 $cm^2$. The electronic conductivity of the powder is calculated with a formula $\delta=h/(S\times R)$, measured in units of S/cm.

SEM Test

Recording characterization parameters of a scanning electron microscope by using a Philips XL-30 field emission scanning electron microscope, and performing an SEM test under conditions of 10 kV and 10 mA.

Measuring a specific capacity of the negative electrode composite material:

Mixing, at a mass ratio of 80:10:10, the negative electrode composite material obtained in each embodiment or comparative embodiment with conductive carbon black and a binder polyacrylic acid (PAA), adding deionized water, and stirring the mixture to form a slurry with a solid content of 30%, coating a copper foil with the slurry that weighs M, drying the copper foil in a vacuum drying oven at 85° C. for 12 hours, cutting the copper foil into discs of 1.4 cm in diameter in a dry environment by using a stamping machine; using a metal lithium sheet as a counter electrode in a glovebox, using a ceglard composite film as a separator, and adding an electrolytic solution to form a coin battery. Performing a charge-discharge test on the battery by using a LAND series battery test system to test the charge-discharge performance of the battery. The capacity obtained in the test is C (mAh), and therefore, the specific capacity of the negative electrode composite material=C/(M×30%×80%).

Testing Performance of a Full Battery

Cycle Test

Charging the battery at a 0.5 C constant current under a 45° C. temperature until the voltage reaches 4.45 V, charging the battery at a constant voltage until the current reaches 0.025 C, leaving the battery to stand for 5 minutes, and then discharging the battery at a current of 0.5 C until the voltage reaches 3.0 V. Performing a cycle test in which the battery is charged at 0.5 C and discharged at 0.5 C by using the capacity obtained in this step as an initial capacity, comparing the capacity obtained in each step with the initial capacity to obtain a plurality of ratios, and obtaining a capacity fading curve by using the ratios.

Testing a Full-Charge Expansion Rate of the Lithium-Ion Battery

Measuring the thickness of the lithium-ion battery in an initial half-charge state by using a spiral micrometer. When the lithium-ion battery is in a fully charged state after being charged and discharged at 45° C. for 400 cycles, measuring the current thickness of the lithium-ion battery by using a spiral micrometer; and comparing the measured thickness with the thickness of the initial half-charged lithium-ion battery to obtain the current expansion rate of the fully charged lithium-ion battery.

Rate Performance

Charging the battery at a 0.5 C constant current under a 25° C. temperature until the voltage reaches 4.45 V, charging the battery at a constant voltage until the current reaches 0.025 C, leaving the battery to stand for 5 minutes, and then discharging the battery at a current of 0.2 C until the voltage reaches 3.0 V. Performing a cycle test in which the battery is charged at 0.5 C and discharged at 2 C by using the capacity obtained in this step as an initial capacity, and calculating the rate performance that is a ratio of the 2 C discharge capacity to the 0.2 C discharge capacity.

Preparing a Full Battery

Preparing a Negative Electrode Plate

Mixing the negative electrode composite material prepared in each embodiment and each comparative embodiment with graphite at a specific ratio to obtain a negative active material powder with a designed specific capacity of 500 mAh/g, stirring the negative active material powder, acetylene black as a conductive agent, and PAA at a mass ratio of 95:1.2:3.8 in a deionized water solvent system thoroughly until they are mixed evenly into a slurry, and coating the slurry onto both surfaces of a copper-foil current collector of 10 μm in thickness; and drying and then cold-pressing the plate so that the compacted density on both sides is 1.8 g/cm$^3$, thereby obtaining a negative electrode plate.

Preparing a Positive Electrode Plate

Mixing an active material $LiCoO_2$, conductive carbon black, and polyvinylidene difluoride (PVDF) as a binder at a mass ratio of 96.7:1.7:1.6 in an N-methyl-pyrrolidone solvent system, blending the mixture into a slurry with a solid content of 0.75, and stirring the slurry evenly. Coating the slurry evenly onto one surface of an aluminum foil as a positive current collector that is 12 μm in thickness, with the coating thickness being 115 μm; and performing drying at 90° C. and performing cold-pressing to obtain a positive electrode plate.

Assembling the Full Battery

Using a PE porous polymer film of 15 μm in thickness as a separator. Stacking the positive electrode plate, the separator, and the negative electrode plate sequentially, placing the separator between the positive electrode and the negative electrode to serve a function of separation, and winding them to obtain an electrode assembly. Putting the electrode assembly into an outer package, injecting the prepared electrolytic solution (EC:DMC:DEC=1:1:1 vol %, the weight percent of FEC is 10 wt %, and the molar concentration of $LiPF_6$ is 1 mol/L), and performing packaging; and performing steps such as chemical formation, degassing, and edge trimming to obtain a full battery.

Preparing a Negative Electrode Composite Material

Embodiment 1

Dissolving 100 grams of glucose in an xylene solvent of 2000 mL in volume, adding 200 grams of polydimethylsiloxane into the solvent, stirring for 4 hours to mix the glucose solution and the polydimethylsiloxane thoroughly, and then heating the solvent to 80° C. and stirring to remove the solvent, drying the mixture in an 80° C. oven for 24 hours, and pyrolyzing the obtained intermediate product at a high temperature of 1100° C. in a tube furnace by using $N_2$ as a protective atmosphere, where the steps of increasing the temperature are: increasing the temperature to 500° C. at a speed of 1° C./min, keeping the temperature for 30 minutes, and then increasing the temperature to 1100° C. at a speed of 3° C./min, and keeping the temperature for 3 hours to obtain a Si—O—C composite material.

Adding 100 grams of Si—O—C composite material, 1 gram of single-walled carbon nanotubes, and 1.5 grams of carboxymethyl cellulose (CMC, CAS number: 9004-32-4) into 500 ml of deionized water, stirring the solution in an MSK-SFM-10 vacuum mixer for 180 minutes at a revolution speed of 10 rpm to 40 rpm, and then continuing to stir the solution for 120 minutes at a revolution speed of 10 rpm to 40 rpm and a rotation speed of 1000 rpm to 1500 rpm, thereby obtaining a mixed slurry.

Relocating the mixed slurry into a centrifugal disc atomizer of a spray-drying granulator, where the centrifugal rotation speed is 2000 rpm, thereby forming tiny droplets. Setting an inlet temperature of the spray-drying granulator to 260° C. and setting an outlet temperature to 105° C., and collecting powder after cooling, thereby obtaining a negative electrode composite material overlaid with a conductive layer on the surface.

Figure 2:
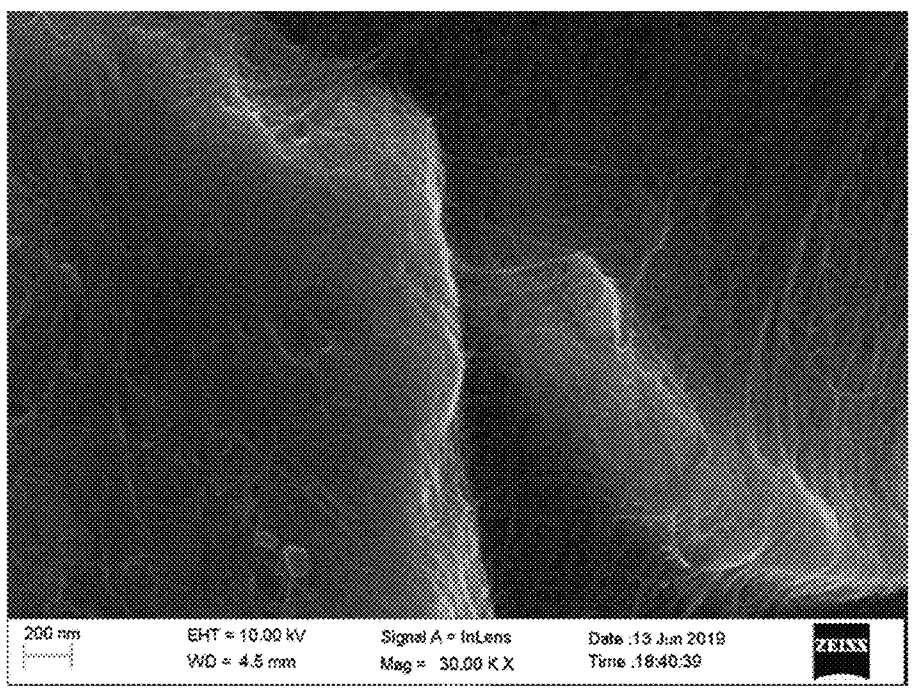
FIG. 2 is a scanning electron microscope image of a surface of a negative electrode composite material according to Embodiment 1.

FIG. 2 shows a scanning electron microscope image of a surface of a negative electrode composite material.

Embodiment 2

This embodiment is the same as Embodiment 1 except that the polydimethylsiloxane is replaced with polyhexamethylcyclotrisilazane, so that a negative electrode composite material containing the Si—N—C composite material is prepared.

Embodiment 3

This embodiment is the same as Embodiment 1 except that the polydimethylsiloxane is replaced with polycarborane methyl siloxane, so that a negative electrode composite material containing the Si—B—C composite material is prepared.

Embodiment 4

This embodiment is the same as Embodiment 1 except that the glucose is replaced with sucrose.

Embodiment 5

This embodiment is the same as Embodiment 1 except that the 100 grams of glucose are replaced with a mixture of 50 grams of glucose and 50 grams of sucrose.

Embodiment 6

This embodiment is the same as Embodiment 1 except that the 200 grams of polydimethylsiloxane are replaced with a mixture of 100 grams of polydimethylsiloxane and 100 grams of polyhexamethylcyclotrisilazane, so that a negative electrode composite material containing the Si—O—N—C composite material is prepared.

Embodiment 7

This embodiment is the same as Embodiment 1 except that the pyrolysis temperature is 900° C.

Embodiment 8

This embodiment is the same as Embodiment 1 except that the pyrolysis temperature is 1300° C.

Embodiment 9

This embodiment is the same as Embodiment 1 except that the pyrolysis temperature is 1500° C.

Embodiment 10

This embodiment is the same as Embodiment 1 except that the centrifugal rotation speed of the spray-drying granulator is 200 rpm.

Embodiment 11

This embodiment is the same as Embodiment 1 except that the centrifugal rotation speed of the spray-drying granulator is 500 rpm.

Embodiment 12

This embodiment is the same as Embodiment 1 except that the centrifugal rotation speed of the spray-drying granulator is 4000 rpm.

Embodiment 13

This embodiment is the same as Embodiment 1 except that the centrifugal rotation speed of the spray-drying granulator is 5000 rpm.

Embodiment 14

This embodiment is the same as Embodiment 1 except that the centrifugal rotation speed of the spray-drying granulator is 6000 rpm.

Embodiment 15

This embodiment is the same as Embodiment 1 except that the mass of the single-walled carbon nanotubes is adjusted to 0.5 g and that the mass of the carboxymethyl cellulose is adjusted to 0.75 g.

Embodiment 16

This embodiment is the same as Embodiment 1 except that the mass of the single-walled carbon nanotubes is adjusted to 2 g and that the mass of the carboxymethyl cellulose is adjusted to 3 g.

Embodiment 17

This embodiment is the same as Embodiment 1 except that the mass of the single-walled carbon nanotubes is adjusted to 5 g and that the mass of the carboxymethyl cellulose is adjusted to 7.5 g.

Embodiment 18

This embodiment is the same as Embodiment 1 except that the mass of the carboxymethyl cellulose is adjusted to 0.5 g.

Embodiment 19

This embodiment is the same as Embodiment 1 except that the mass of the carboxymethyl cellulose is adjusted to 3 g.

Embodiment 20

This embodiment is the same as Embodiment 1 except that the mass of the carboxymethyl cellulose is adjusted to 5 g.

Embodiment 21

This embodiment is the same as Embodiment 1 except that the carboxymethyl cellulose is replaced with polyacrylic acid (PAA).

Embodiment 22

This embodiment is the same as Embodiment 1 except that the 1.5 grams of carboxymethyl cellulose are replaced with a mixture of 0.75 gram of carboxymethyl cellulose and 0.75 gram of polyacrylic acid.

Embodiment 23

This embodiment is the same as Embodiment 1 except that the 1 gram of single-walled carbon nanotubes is replaced with a mixture of 0.5 gram of single-walled carbon nanotubes and 0.5 gram of multi-walled carbon nanotubes.

Embodiment 24

This embodiment is the same as Embodiment 1 except that the single-walled carbon nanotubes are replaced with multi-walled carbon nanotubes.

Comparative Embodiment 1

This embodiment is the same as Embodiment 1 except that the pyrolysis temperature is 600° C.

Comparative Embodiment 2

This embodiment is the same as Embodiment 1 except that the pyrolysis temperature is 1800° C.

Comparative Embodiment 3

This embodiment is the same as Embodiment 1 except that the Si—O—C composite material prepared in Embodiment 1 is not mixed with the polymer or the conductive carbon material, but is directly granulated as a negative electrode composite material for preparing the negative electrode plate.

Comparative Embodiment 4

This embodiment is the same as Embodiment 1 except that the conductive layer contains no conductive carbon material.

Comparative Embodiment 5

This embodiment is the same as Embodiment 1 except that the conductive layer contains no polymer.

Table 1 shows the parameters and performance test results in each embodiment and each comparative embodiment.

TABLE 1

| | Carbon source (100 g) | Organo-silicon (200 g) | Pyro-lysis temper-ature (° C.) | Conduc-tive carbon material | Poly-mer | Spray rota-tion speed (rpm) | $D_{v50}$ of Si—M—C com-posite mater-ial 1 (μm) | $D_{v50}$ of negative electrode composite material (μm) | Conduc-tivity of powder (S/cm) | Peak width at half height at −5 ppm ± 5 ppm in solid-state nuclear magnetic resonance test (ppm) | Number of cycles when the capacity attenuates to 80% | Full-charge expan-sion rate | C-rate |
|---|---|---|---|---|---|---|---|---|---|---|---|---|---|
| Embodi-ment 1 | Glucose | Polydimethyl siloxane | 1100 | SWCNT (1 g) | CMC (1.5 g) | 2000 | 5.4 | 6.7 | 3.15 | 20 | 485 | 4.8% | 82.1% |
| Embodi-ment 2 | Glucose | Polyhexamet hylcyclotrisil-azane | 1100 | SWCNT (1 g) | CMC (1.5 g) | 2000 | 5.3 | 6.8 | 3.26 | 20 | 478 | 4.9% | 82.4% |
| Embodi-ment 3 siloxane | Glucose | Polycarborane methyl | 1100 | SWCNT (1 g) | CMC (1.5 g) | 2000 | 5.5 | 6.7 | 3.22 | 20 | 491 | 4.9% | 81.9% |
| Embodi-ment 4 | Sucrose | Polydimethyl siloxane | 1100 | SWCNT (1 g) | CMC (1.5 g) | 2000 | 5.6 | 6.9 | 3.07 | 20 | 482 | 4.7% | 82.3% |
| Embodi-ment 5 | Glucose (50 g) + sucrose (50 g) | Polydimethyl siloxane | 1100 | SWCNT (1 g) | CMC (1.5 g) | 2000 | 5.4 | 6.8 | 3.32 | 20 | 494 | 4.9% | 81.5% |
| Embodi-ment 6 | Glucose | Polydimethyl siloxane (100 g) + polyhexamet hylcyclotrisil azane (100 g) | 1100 | SWCNT (1 g) | CMC (1.5 g) | 2000 | 5.5 | 6.8 | 3.02 | 20 | 492 | 4.7% | 82.4% |
| Embodi-ment 7 | Glucose | Polydimethyl siloxane | 900 | SWCNT (1 g) | CMC (1.5 g) | 2000 | 4.9 | 6.2 | 2.28 | 25 | 441 | 4.4% | 78.4% |
| Embodi-ment 8 | Glucose | Polydimethyl siloxane | 1300 | SWCNT (1 g) | CMC (1.5 g) | 2000 | 6.1 | 7.5 | 4.78 | 10 | 501 | 5.2% | 84.4% |
| Embodi-ment 9 | Glucose | Polydimethyl siloxane | 1500 | SWCNT (1 g) | CMC (1.5 g) | 2000 | 7.5 | 8.9 | 5.24 | 8 | 523 | 5.9% | 85.6% |
| Embodi-ment 10 | Glucose | Polydimethyl siloxane | 1100 | SWCNT (1 g) | CMC (1.5 g) | 200 | 5.3 | 14.5 | 3.24 | 20 | 431 | 6.9% | 75.6% |
| Embodi-ment 11 | Glucose | Polydimethyl siloxane | 1100 | SWCNT (1 g) | CMC (1.5 g) | 500 | 5.3 | 11.2 | 2.98 | 20 | 456 | 6.2% | 79.2% |
| Embodi-ment 12 | Glucose | Polydimethyl siloxane | 1100 | SWCNT (1 g) | CMC (1.5 g) | 4000 | 5.5 | 6.2 | 3.07 | 20 | 496 | 4.6% | 83.4% |
| Embodi-ment 13 | Glucose | Polydimethyl siloxane | 1100 | SWCNT (1 g) | CMC (1.5 g) | 5000 | 5.6 | 6.0 | 3.11 | 20 | 512 | 4.5% | 84.1% |
| Embodi-ment 14 | Glucose | Polydimethyl siloxane | 1100 | SWCNT (1 g) | CMC (1.5 g) | 6000 | 5.6 | 6.0 | 3.31 | 20 | 509 | 4.6% | 84.3% |
| Embodi-ment 15 | Glucose | Polydimethyl siloxane | 1100 | SWCNT (0.5 g) | CMC (0.75 g) | 2000 | 5.3 | 6.2 | 1.23 | 20 | 446 | 4.5% | 84.5% |
| Embodi-ment 16 | Glucose | Polydimethyl siloxane | 1100 | SWCNT (2 g) | CMC (3 g) | 2000 | 5.5 | 7.6 | 5.07 | 20 | 521 | 5.7% | 80.8% |
| Embodi-ment 17 | Glucose | Polydimethyl siloxane | 1100 | SWCNT (5 g) | CMC (7.5 g) | 2000 | 5.6 | 9.8 | 6.11 | 20 | 545 | 6.5% | 78.4% |
| Embodi-ment 18 | Glucose | Polydimethyl siloxane | 1100 | SWCNT (1 g) | CMC (0.5 g) | 2000 | 5.3 | 7.3 | 4.07 | 20 | 454 | 5.2% | 83.2% |
| Embodi-ment 19 | Glucose | Polydimethyl siloxane | 1100 | SWCNT (1 g) | CMC (3 g) | 2000 | 5.5 | 6.4 | 2.67 | 20 | 489 | 4.6% | 82.6% |
| Embodi-ment 20 | Glucose | Polydimethyl siloxane | 1100 | SWCNT (1 g) | CMC (5 g) | 2000 | 5.6 | 7.5 | 1.86 | 20 | 447 | 5.4% | 79.5% |
| Embodi-ment 21 | Glucose | Polydimethyl siloxane | 1100 | SWCNT (1 g) | PAA (1.5 g) | 2000 | 5.3 | 6.8 | 3.32 | 20 | 491 | 4.9% | 82.4% |
| Embodi-ment 22 | Glucose | Polydimethyl siloxane | 1100 | SWCNT (1 g) | CMC (0.75 g) + PAA (0.75 g) | 2000 | 5.5 | 6.6 | 3.23 | 20 | 487 | 4.8% | 81.8% |
| Embodi-ment 23 | Glucose | Polydimethyl siloxane | 1100 | SWCNT (0.5 g) + MWCNT (0.5 g) | CMC (1.5 g) | 2000 | 5.3 | 6.5 | 1.75 | 20 | 451 | 4.6% | 81.4% |
| Embodi-ment 24 | Glucose | Polydimethyl siloxane | 1100 | MWCNT (1 g) | CMC (1.5 g) | 2000 | 5.5 | 6.3 | 0.85 | 20 | 421 | 4.5% | 80.2% |

TABLE 1-continued

| | Carbon source (100 g) | Organo-silicon (200 g) | Pyrolysis temperature (° C.) | Conductive carbon material | Polymer | Spray rotation speed (rpm) | $D_{v50}$ of Si—M—C composite material 1 (μm) | $D_{v50}$ of negative electrode composite material (μm) | Conductivity of powder (S/cm) | Peak width at half height at −5 ppm ± 5 ppm in solid-state nuclear magnetic resonance test (ppm) | Number of cycles when the capacity attenuates to 80% | Full-charge expansion rate | C-rate |
|---|---|---|---|---|---|---|---|---|---|---|---|---|---|
| Comparative Embodiment 1 | Glucose | Polydimethyl siloxane | 600 | SWCNT (1 g) | CMC (1.5 g) | 2000 | 2.9 | 4.2 | 1.07 | 30 | 402 | 4.2% | 71.3% |
| Comparative Embodiment 2 | Glucose | Polydimethyl siloxane | 1800 | SWCNT (1 g) | CMC (1.5 g) | 2000 | 9.0 | 13.5 | 7.32 | 5 | 543 | 7.0% | 87.3% |
| Comparative Embodiment 3 | Glucose | Polydimethyl siloxane | 1100 | — | — | 2000 | 5.3 | 5.3 | 0.03 | 20 | 312 | 4.2% | 68.5% |
| Comparative Embodiment 4 | Glucose | Polydimethyl siloxane | 1100 | — | CMC (1.5 g) | 2000 | 5.3 | 6.4 | 0.02 | 20 | 289 | 4.6% | 66.4% |
| Comparative Embodiment 5 | Glucose siloxane | Polydimethyl | 1100 | SWCNT (1 g) | — | 2000 | 5.6 | 20.5 | 5.78 | 20 | 342 | 6.7% | 72.3% |

As can be seen from the comparison of Embodiments 1 to 6, different Si-M-C composite materials can be prepared by using different carbon sources such as glucose, sucrose, and a mixture thereof and by using organosilicon sources containing different elements. The Si-M-C composite materials containing different elements achieve similar performance.

As can be seen from Embodiments 1 and 7 to 9 versus Comparative Embodiments 1 and 2, when the peak width at half height of a shift peak at −5 ppm±5 ppm of the silicon element in the solid-state nuclear magnetic resonance test is larger, the expansion rate of the negative electrode composite material is lower; when the peak width at half height is smaller, the cycle performance of the full battery is higher, and the rate performance is higher; and, when the peak width at half height falls between 7 ppm to 28 ppm, the negative electrode composite material achieves relatively high cycle performance, relatively high rate performance, and a relatively low expansion rate.

In addition, as can be further seen from Embodiments 1 and 7 to 9, the pyrolysis temperature affects the peak width at half height and the particle diameter of the Si-M-C composite material at −5 ppm±5 ppm. When the pyrolysis temperature is higher, the peak width at half height of the shift peak of the silicon element at −5 ppm±5 ppm in the solid-state nuclear magnetic resonance test is smaller, and the particle diameter of the Si-M-C composite material is larger. By contrast, when the pyrolysis temperature is lower, the peak width at half height at −5 ppm±5 ppm is larger, and the particle diameter of the Si-M-C composite material is smaller.

As can be seen from Embodiment 1 versus Embodiments 10 to 14, as the particle diameter of the negative electrode composite material decreases, the cycle performance and the rate performance of a battery cell are enhanced, and the cell expansion is suppressed. Without being limited to any theory, a possible reason is that the negative electrode composite material is more evenly dispersed in the hybrid layer of the electrode plate and that the polarization is suppressed.

As can be seen from Embodiments 1 and 15 to 17 versus Comparative Embodiment 3, when the content of the conductive layer is increased, the conductivity of the powder can be increased, and the cycle performance of the full battery is enhanced. However, the increase of the polymer will decline the rate performance, and the increase of the content of the conductive layer is prone to cause agglomeration of the negative electrode composite material and aggravate cell expansion. It is found that when the content of the conductive layer falls within a range of 0.05% to 10%, the negative electrode composite material achieves relatively high cycle performance, relatively high rate performance, and a relatively low expansion rate.

As can be seen from Embodiments 1 and 18 to 20 versus Comparative Embodiments 4 and 5, the existence of a specific amount of polymer is conducive to the dispersion of the conductive carbon material, thereby reducing the particle diameter of the negative electrode composite material. When the content of the polymer is too high, the particle diameter of the negative electrode composite material gradually increases yet. Further, as the weight percent of the polymer and the conductive carbon material increases, the cycle performance of the full battery increases, and the expansion rate decreases. In addition, as the weight percent of the polymer increases, the rate performance of the full battery decreases. It is found that when the mass ratio between the conductive carbon material and the polymer is 1:0.2 to 1:10, preferably 1:0.5 to 1:5, the negative electrode composite material achieves relatively high cycle performance, relatively high rate performance, and a relatively low expansion rate.

Embodiments 21 to 24 show that in this application, when the conductive layer is prepared by using different types of polymers and different types of conductive carbon materials, the negative electrode composite materials of similar performance can be obtained.

The foregoing descriptions are merely preferred embodiments of this application, but are not intended to limit this application. Any modifications, equivalent substitutions, and improvements made within the spirit and principles of this application fall within the protection scope of this application.

What is claimed is:

1. A negative electrode composite material, comprising: a Si-M-C composite material, wherein a conductive layer exists on a surface of the Si-M-C composite material; M comprises at least one of boron or nitrogen; chemical shifts of a silicon element in the Si-M-C composite material as measured in a solid-state nuclear magnetic resonance test comprise −5 ppm+5 ppm, −35 ppm+5 ppm, −75 ppm+5 ppm, −110 ppm+5 ppm, a peak width at half height at −5 ppm+5 ppm is K, and 8 ppm≤K≤25 ppm;

wherein the conductive layer comprises a polymer and a conductive carbon material;

wherein a mass ratio between the conductive carbon material and the polymer is 1:0.2 to 1:10.

2. The negative electrode composite material according to claim 1, wherein $D_{v50}$ of the Si-M-C composite material is 2.0 μm to 8.0 μm; and $D_{v50}$ of the negative electrode composite material is 3.0 μm to 12.0 μm.

3. The negative electrode composite material according to claim 1, wherein a thickness of the conductive layer is 1 nm to 100 nm.

4. The negative electrode composite material according to claim 1, wherein a weight of the conductive layer is 0.05% to 10% of a total weight of the negative electrode composite material.

5. The negative electrode composite material according to claim 1, wherein the conductive carbon material comprises at least one of single-walled carbon nanotubes, multi-walled carbon nanotubes, carbon nanoparticles, carbon fiber, or graphene.

6. The negative electrode composite material according to claim 1, wherein the polymer comprises at least one of polyvinylidene difluoride, carboxymethyl cellulose, sodium carboxymethyl cellulose, polyvinylpyrrolidone, polyacrylic acid, polystyrene butadiene rubber, polyacrylamide, polyimide, polyamide imide, or a derivative thereof.

7. The negative electrode composite material according to claim 1, wherein the mass ratio between the conductive carbon material and the polymer is 1:5 to 1:10.

8. The negative electrode composite material according to claim 1, wherein M further comprises oxygen.

9. A negative electrode plate, comprising a negative electrode composite material, wherein the negative electrode composite material comprises a Si-M-C composite material, wherein a conductive layer exists on a surface of the Si-M-C composite material, M comprises at least one of boron or nitrogen; chemical shifts of a silicon element in the Si-M-C composite material as measured in a solid-state nuclear magnetic resonance test comprise −5 ppm+5 ppm, −35 ppm+5 ppm, −75 ppm+5 ppm, −110 ppm+5 ppm, a peak width at half height at −5 ppm+5 ppm is K, and 8 ppm≤K≤25 ppm;

wherein the conductive layer comprises a polymer and a conductive carbon material;

wherein a mass ratio between the conductive carbon material and the polymer is 1:0.2 to 1:10.

10. The negative electrode plate according to claim 9, wherein a thickness of the conductive layer is 1 nm to 100 nm.

11. The negative electrode plate according to claim 9, wherein a weight of the conductive layer is 0.05% to 10% of a total weight of the negative electrode composite material.

12. The negative electrode plate according to claim 9, wherein the conductive carbon material comprises at least one of single-walled carbon nanotubes, multi-walled carbon nanotubes, carbon nanoparticles, carbon fiber, or graphene.

13. The negative electrode plate according to claim 9, wherein the polymer comprises at least one of polyvinylidene difluoride, carboxymethyl cellulose, sodium carboxymethyl cellulose, polyvinylpyrrolidone, polyacrylic acid, polystyrene butadiene rubber, polyacrylamide, polyimide, polyamide imide, or a derivative thereof.

14. An electrochemical device, comprising the negative electrode plate according to claim 9.

15. An electronic device, comprising the electrochemical device according to claim 14.

* * * * *